US012027174B2

(12) United States Patent
Pihlajakuja et al.

(10) Patent No.: US 12,027,174 B2
(45) Date of Patent: Jul. 2, 2024

(54) APPARATUS, METHODS, AND COMPUTER PROGRAMS FOR ENCODING SPATIAL METADATA

(71) Applicant: Nokia Technologies Oy, Espoo (FI)

(72) Inventors: Tapani Pihlajakuja, Vantaa (FI); Lasse Laaksonen, Tampere (FI); Antti Eronen, Tampere (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 239 days.

(21) Appl. No.: 17/287,568

(22) PCT Filed: Oct. 28, 2019

(86) PCT No.: PCT/FI2019/050766
§ 371 (c)(1),
(2) Date: Apr. 22, 2021

(87) PCT Pub. No.: WO2020/089523
PCT Pub. Date: May 7, 2020

(65) Prior Publication Data

US 2022/0115024 A1 Apr. 14, 2022

(30) Foreign Application Priority Data

Nov. 1, 2018 (GB) ...................................... 1817887

(51) Int. Cl.
*G10L 19/008* (2013.01)
*G10L 19/00* (2013.01)

(52) U.S. Cl.
CPC .... *G10L 19/008* (2013.01); *G10L 2019/0001* (2013.01)

(58) Field of Classification Search
CPC ..... H04N 19/61; G10L 19/008; G10L 19/167; G10L 19/24; G10L 19/032; G10L 19/04
(Continued)

(56) References Cited

U.S. PATENT DOCUMENTS 9,762,907 B2 9/2017 Fallon et al.
11,632,549 B2 * 4/2023 Setiawan .............. H04N 19/94 375/240.03
(Continued)

FOREIGN PATENT DOCUMENTS

CN 106023999 A 10/2016
CN 106575166 A 4/2017
(Continued)

OTHER PUBLICATIONS

Herre, Jurgen et al. "MPEG-H 3D Audio—The New Standard for Coding of Immersive Spatial Audio" IEEE Journal of Selected Topics in Signal Processing, vol. 9, No. 5, Aug. 2015.
(Continued)

*Primary Examiner* — Alexander Krzystan
(74) *Attorney, Agent, or Firm* — Harrington & Smith

(57) ABSTRACT

Examples of the disclosure relate to apparatus, methods and computer programs for encoding spatial metadata. The example apparatus includes circuitry configured for obtaining spatial metadata associated with spatial audio content and obtaining a configuration parameter indicative of a source format of the spatial audio content. The circuitry is also configured to use the configuration parameter to select a method of compression of the spatial metadata associated with the spatial audio content.

20 Claims, 6 Drawing Sheets

Figure 1:
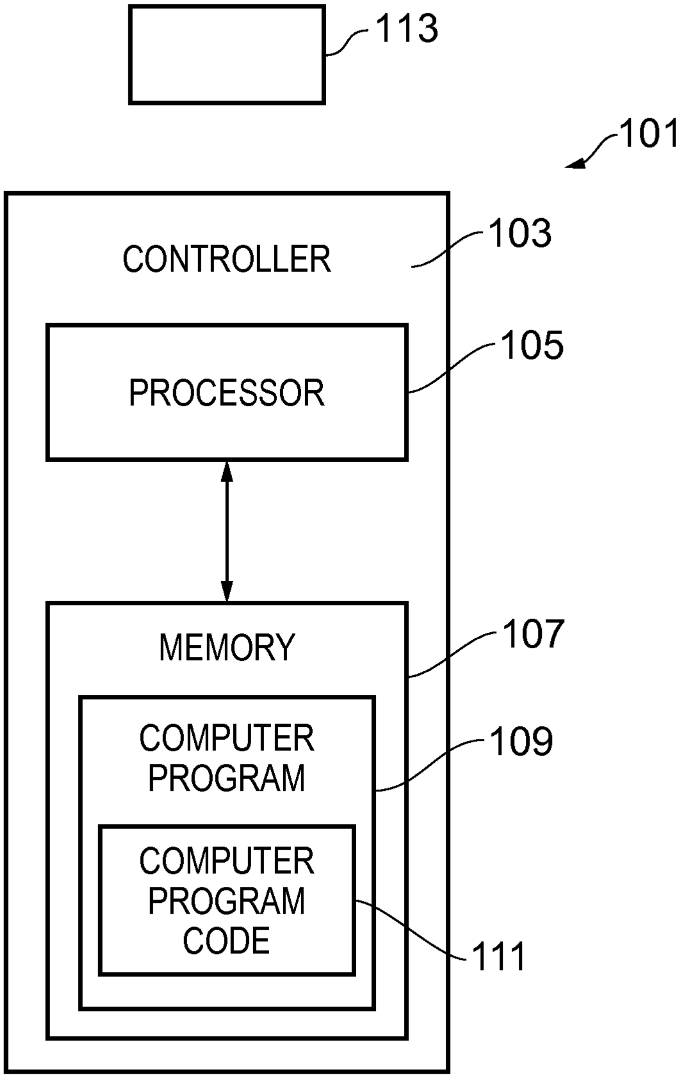

(58) Field of Classification Search
USPC ............... 370/240.03; 381/22, 23, 310, 303; 700/94
See application file for complete search history.

(56) References Cited

U.S. PATENT DOCUMENTS

| | | | | |
|---|---|---|---|---|
| 2006/0233379 | A1 | 10/2006 | Villemoes et al. | 381/23 |
| 2006/0235865 | A1 | 10/2006 | Sperschneider et al. | 707/101 |
| 2008/0162523 | A1 | 7/2008 | Kraus et al. | 707/101 |
| 2009/0248425 | A1 * | 10/2009 | Vetterli | G10L 19/008 704/503 |
| 2009/0271184 | A1 * | 10/2009 | Goto | G10L 19/24 704/223 |
| 2013/0208903 | A1 * | 8/2013 | Ojala | G10H 7/00 381/23 |
| 2015/0332691 | A1 * | 11/2015 | Kim | G10L 19/038 704/222 |
| 2016/0092461 | A1 | 3/2016 | Flick | |
| 2016/0133267 | A1 | 5/2016 | Adami et al. | 19/20 |
| 2016/0254028 | A1 | 9/2016 | Atkins et al. | |
| 2018/0213229 | A1 | 7/2018 | Setiawan et al. | 19/124 |
| 2020/0311077 | A1 * | 10/2020 | Zhang | G06F 3/068 |

FOREIGN PATENT DOCUMENTS

| | | | |
|---|---|---|---|
| JP | 2008536410 | A | 9/2008 |
| JP | 2013543146 | A | 11/2013 |
| JP | 2016525715 | A | 8/2016 |
| JP | 2016526189 | A | 9/2016 |
| WO | WO-2005/116916 | A1 | 12/2005 |
| WO | WO-2006/108463 | A1 | 10/2006 |
| WO | WO 2008/100098 | A1 | 8/2008 |
| WO | WO 2014/125289 | A1 | 8/2014 |
| WO | WO-2015/010998 | A1 | 1/2015 |
| WO | WO-2015/176003 | A1 | 11/2015 |

OTHER PUBLICATIONS

Li, Gang, et al., "The Perceptual Lossless Quantization of Spatial Parameter for 3D Audio Signals", Dec. 2017, International Conference on Multimedia Modeling, 1 pg., abstract only.

Wang, Jing, et al., "Context-based adaptive arithmetic coding in time and frequency domain for the lossless compression of audio coding parameters at variable rate", May 2013, EURASI Journal on Audio Speech and Music Processing, 1 pg., abstract only.

Neuendorf, Max, et al., "Draft of the 2nd edition of ISO/IEC 23008-3 3D Audio", Fraunhofer IIS, ISO/IEC JTC1/SC29/WG11 MPEG2016/M39243, Oct. 16, 2016.

* cited by examiner

APPARATUS, METHODS, AND COMPUTER PROGRAMS FOR ENCODING SPATIAL METADATA

CROSS REFERENCE TO RELATED APPLICATION

This patent application is a U.S. National Stage application of International Patent Application Number PCT/FI2019/050766 filed Oct. 28, 2019, which is hereby incorporated by reference in its entirety, and claims priority to GB 1817887.1 filed Nov. 1, 2018.

TECHNOLOGICAL FIELD

Examples of the disclosure relate to apparatus, methods and computer programs for encoding spatial metadata. Some relate to apparatus, methods and computer programs for encoding spatial metadata associated with spatial audio content.

BACKGROUND

Spatial audio content may be used in immersive audio applications such as mediated reality content applications which could be virtual reality, augmented reality, mixed reality, extended reality or any other suitable type of applications. Spatial metadata may be associated with the spatial audio content. The spatial metadata may contain information which enables the spatial properties of the spatial audio content to be recreated.

BRIEF SUMMARY

According to various, but not necessarily all, examples of the disclosure there may be provided an apparatus comprising means for: obtaining spatial metadata associated with spatial audio content; obtaining a configuration parameter indicative of a source format of the spatial audio content; and using the configuration parameter to select a method of compression of the spatial metadata associated with the spatial audio content.

The configuration parameter may be used to select a codebook to compress the spatial metadata associated with the spatial audio content.

The configuration parameter may be used to enable a codebook for compressing the spatial metadata to be created.

The codebook may be used for encoding and decoding the spatial metadata.

The source format indicated by the configuration parameter may indicate a format of spatial audio that was used to obtain the spatial metadata.

The spatial metadata may comprise data indicative of spatial parameters of the spatial audio content.

The method of compression may be selected independently of the content of the obtained spatial audio content.

The means may be configured to obtain the spatial audio content.

The source configuration parameter may be obtained with the spatial audio content.

The source configuration parameter may be obtained separately to the spatial audio content.

According to various, but not necessarily all, examples of the disclosure there may be provided an apparatus processing circuitry; and memory circuitry including computer program code, the memory circuitry and the computer program code configured to, with the processing circuitry, cause the apparatus to: obtain spatial metadata associated with spatial audio content; obtain a configuration parameter indicative of a source format of the spatial audio content; and use the configuration parameter to select a method of compression of the spatial metadata associated with the spatial audio content.

According to various, but not necessarily all, examples of the disclosure there may be provided an encoding device comprising an apparatus as claimed in any preceding claim and one or more transceivers configured to transmit at least the spatial metadata to a decoding device.

According to various, but not necessarily all, examples of the disclosure there may be provided a method comprising: obtaining spatial metadata associated with spatial audio content; obtaining a configuration parameter indicative of a source format of the spatial audio content; and using the configuration parameter to select a method of compression of the spatial metadata associated with the spatial audio content.

The configuration parameter may be used to select a codebook to compress the spatial metadata associated with the spatial audio content.

According to various, but not necessarily all, examples of the disclosure there may be provided a computer program comprising computer program instructions that, when executed by processing circuitry, cause: obtaining spatial metadata associated with spatial audio content; obtaining a configuration parameter indicative of a source format of the spatial audio content; and using the configuration parameter to select a method of compression of the spatial metadata associated with the spatial audio content.

The configuration parameter may be used to select a codebook to compress the spatial metadata associated with the spatial audio content.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided an apparatus comprising means for: receiving spatial audio content; receiving spatial metadata associated with the spatial audio content; and receiving information indicative of a method used to compress the spatial metadata associated with the spatial audio content wherein the method used to compress the spatial metadata is selected based on a source format of the spatial audio content.

The information indicative of the method used to compress the spatial metadata may comprise a source configuration parameter.

The information indicative of the method used to compress the spatial metadata may comprise a codebook that has been selected using a source configuration parameter.

According to various, but not necessarily all, examples of the disclosure there may be provided an apparatus comprising processing circuitry; and memory circuitry including computer program code, the memory circuitry and the computer program code configured to, with the processing circuitry, cause the apparatus to: receive spatial audio content; receive spatial metadata associated with the spatial audio content; and receive information indicative of a method used to compress the spatial metadata associated with the spatial audio content wherein the method used to compress the spatial metadata is selected based on a source format of the spatial audio content.

According to various, but not necessarily all, examples of the disclosure there may be provided a decoding device comprising an apparatus as described above and one or more transceivers configured to receive the spatial audio content and the spatial metadata from a decoding device.

According to various, but not necessarily all, examples of the disclosure there may be provided a method comprising: receiving spatial audio content; receiving spatial metadata associated with the spatial audio content; and receiving information indicative of a method used to compress the spatial metadata associated with the spatial audio content wherein the method used to compress the spatial metadata is selected based on a source format of the spatial audio content.

The information indicative of the method used to compress the spatial metadata may comprise a source configuration parameter.

According to various, but not necessarily all, examples of the disclosure there may be provided a computer program comprising computer program instructions that, when executed by processing circuitry, cause: receiving spatial audio content; receiving spatial metadata associated with the spatial audio content; and receiving information indicative of a method used to compress the spatial metadata associated with the spatial audio content wherein the method used to compress the spatial metadata is selected based on a source format of the spatial audio content.

The information indicative of the method used to compress the spatial metadata may comprise a source configuration parameter.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

BRIEF DESCRIPTION

Figure 2:
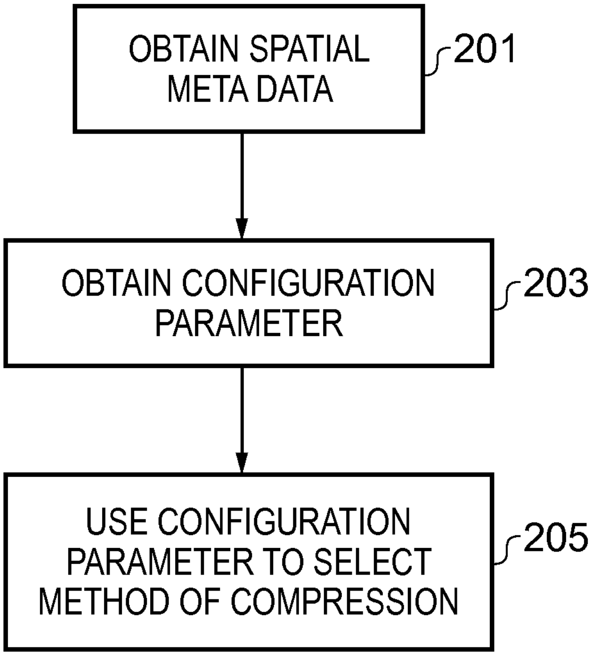
Figure 3:
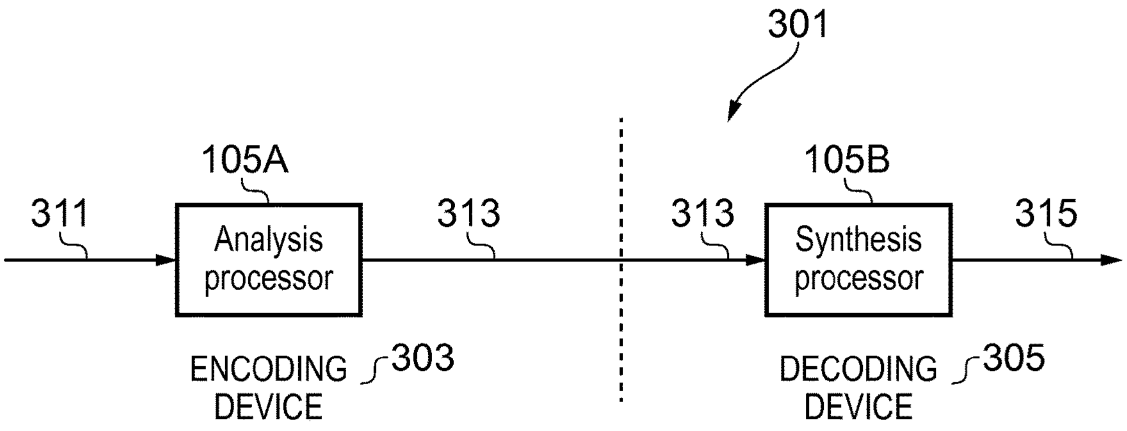
Figure 4:
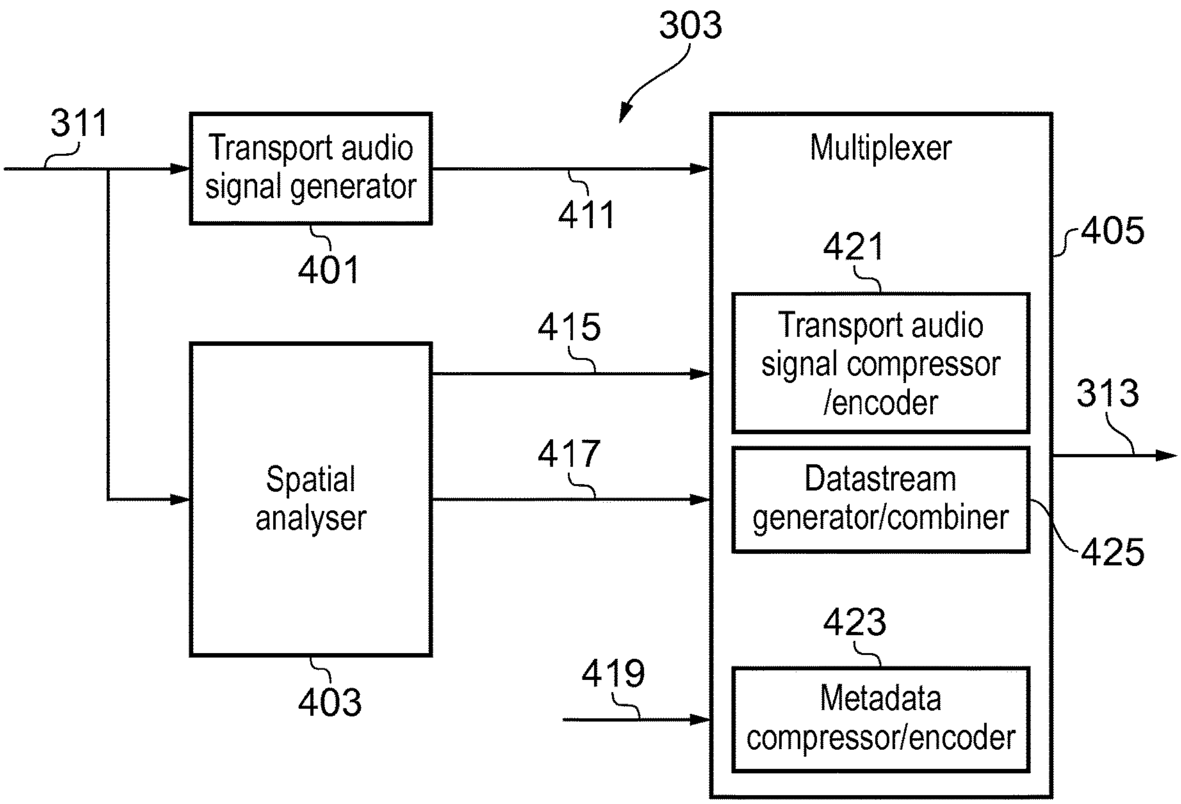
Figure 5:
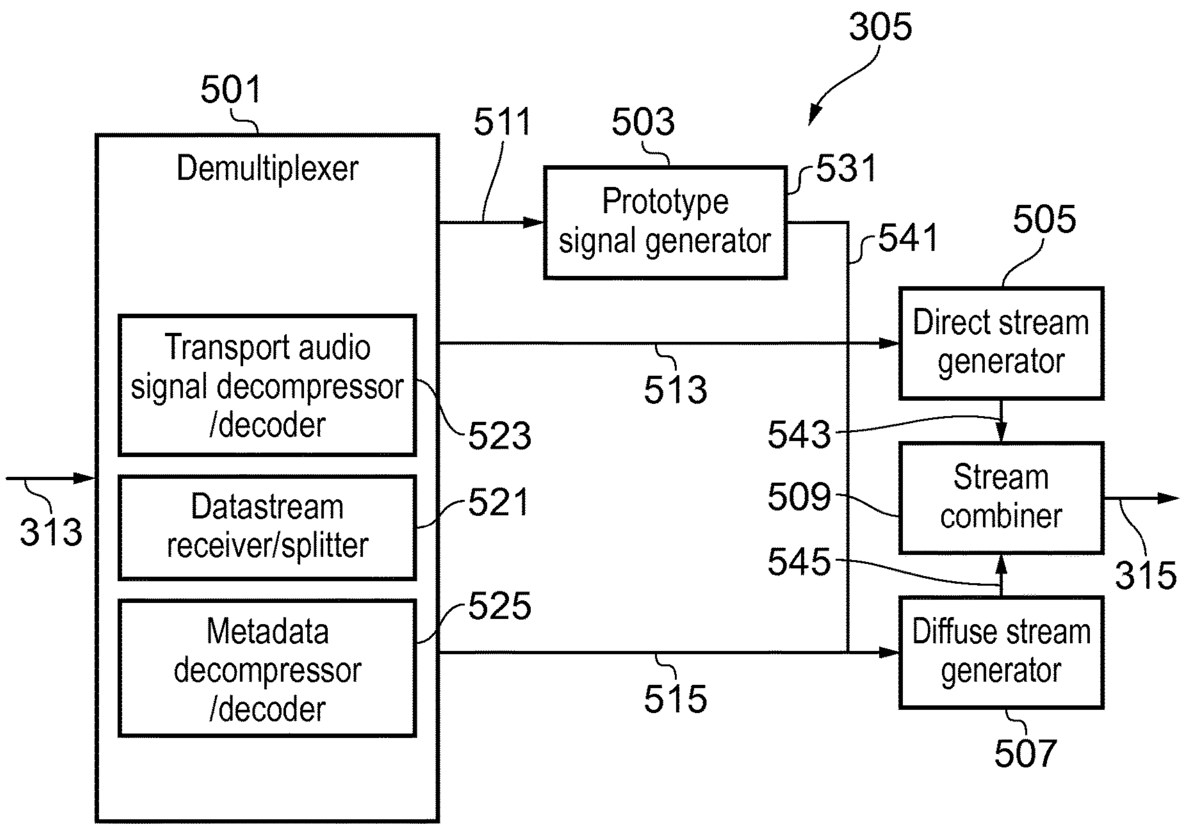
Figure 6:
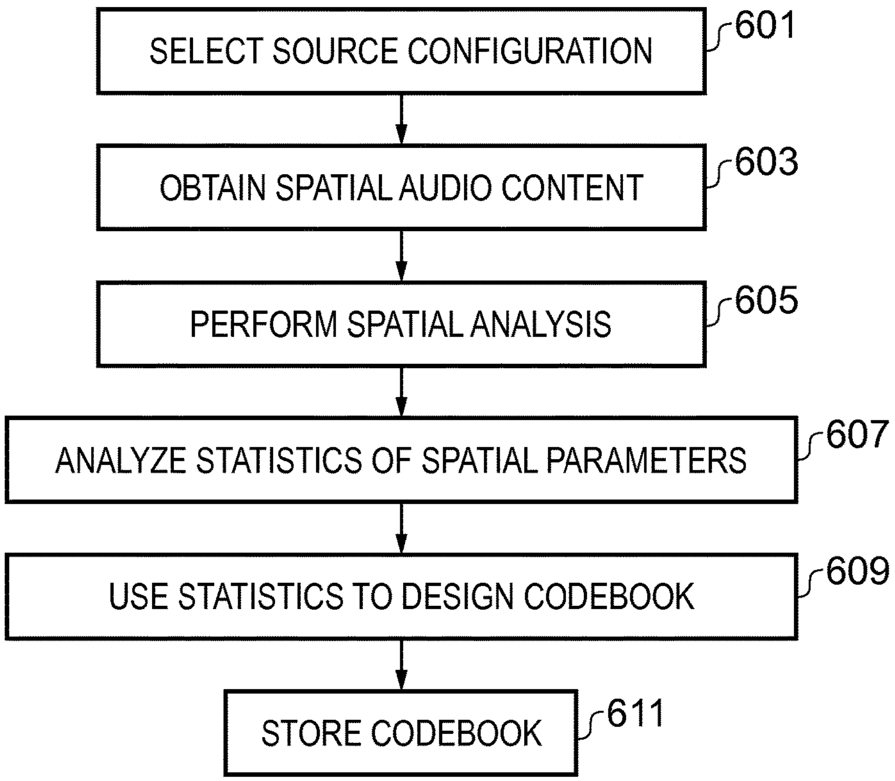
Figure 7:
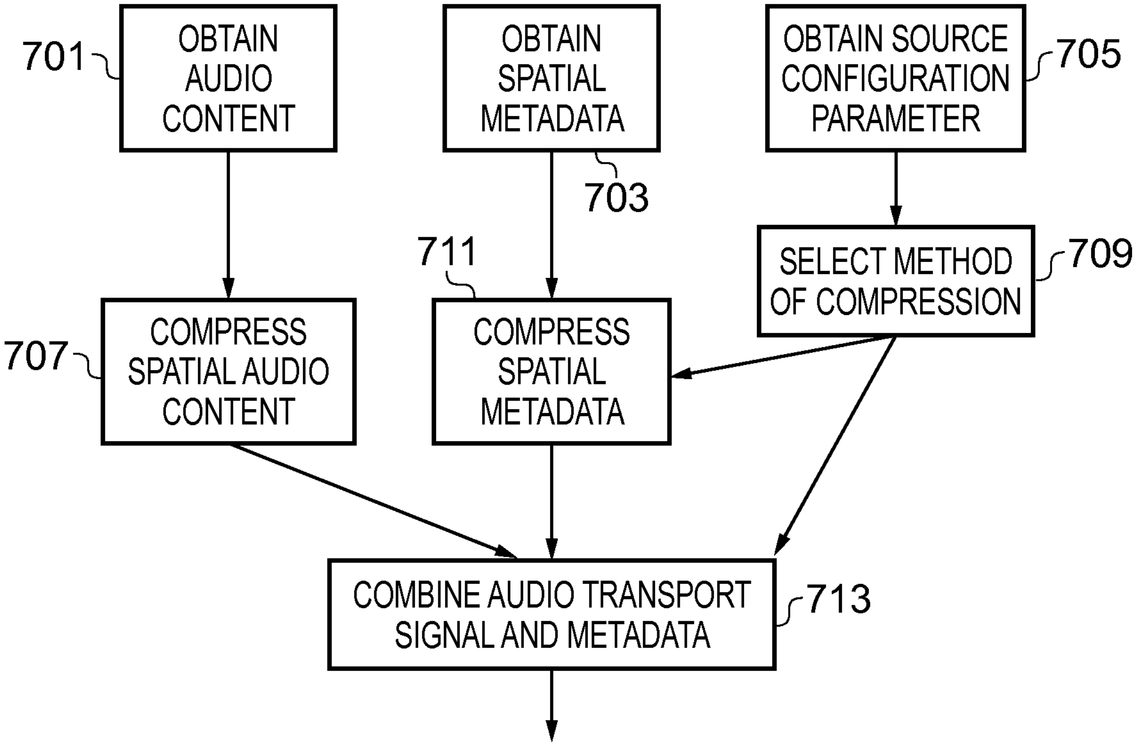
Figure 8:
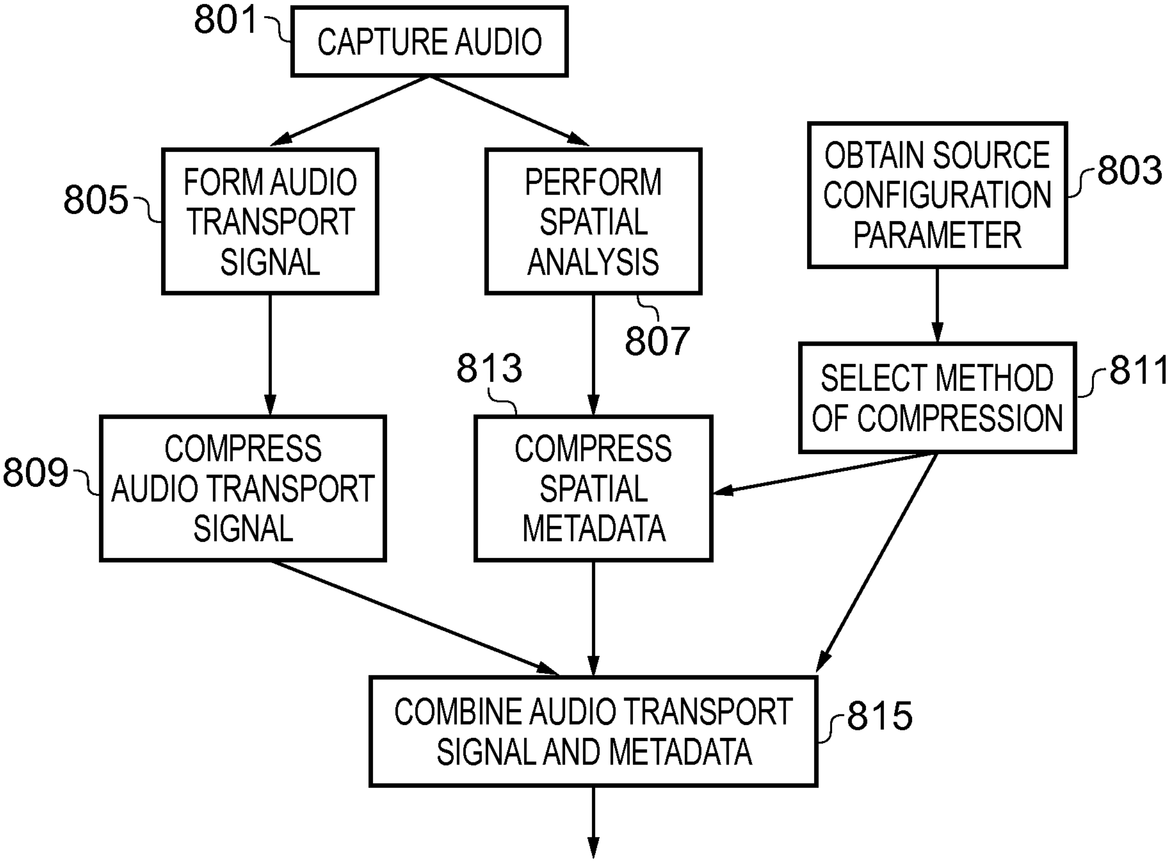
Figure 9:
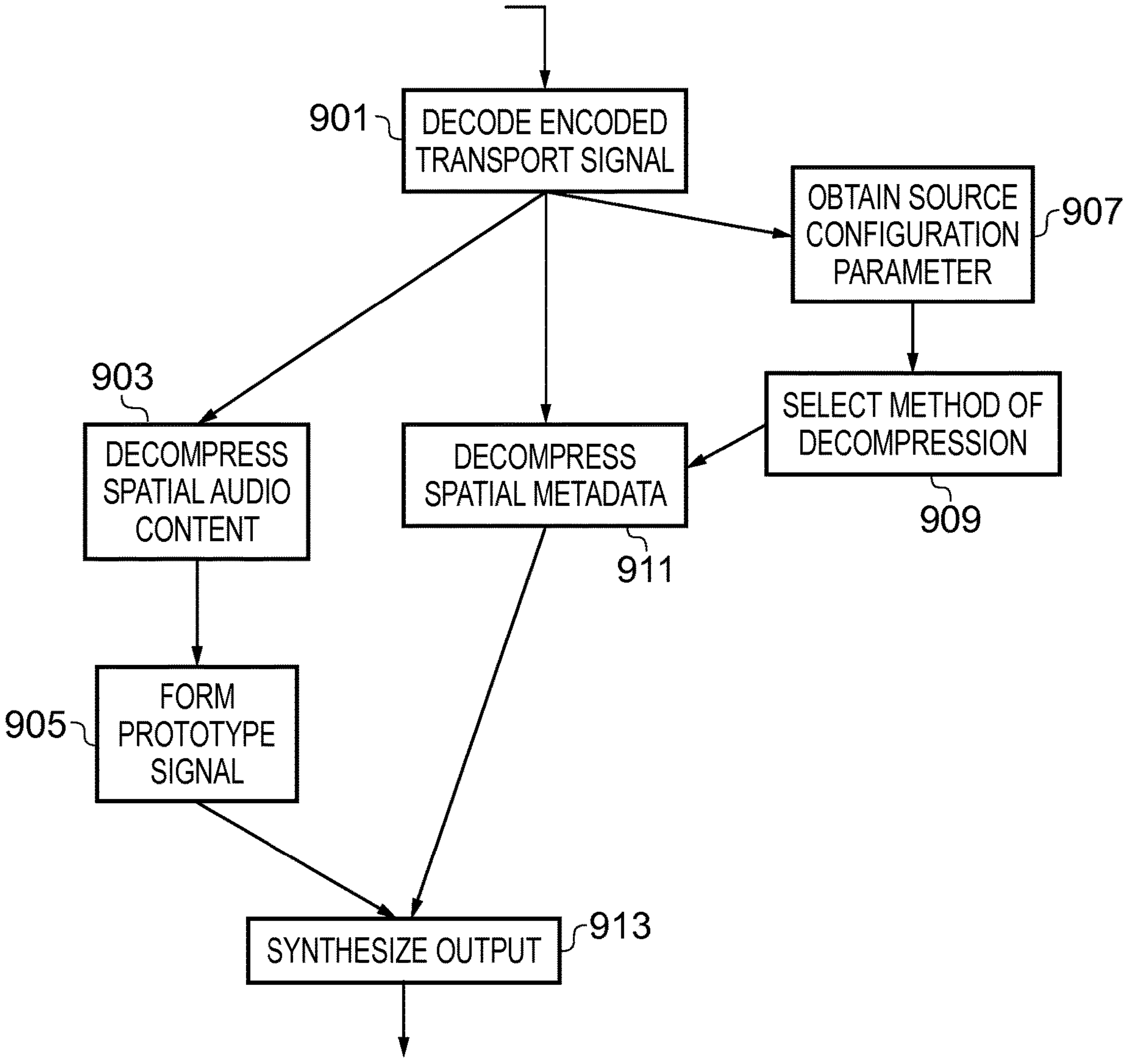

Some example embodiments will now be described with reference to the accompanying drawings in which:

FIG. 1 illustrates an example apparatus;
FIG. 2 illustrates an example method;
FIG. 3 illustrates an example system;
FIG. 4 illustrates an example encoding device;
FIG. 5 illustrates an example decoding device;
FIG. 6 illustrates another example method;
FIG. 7 illustrates an example encoding method;
FIG. 8 illustrates another example encoding method; and
FIG. 9 illustrates an example decoding method.

DETAILED DESCRIPTION

The figures illustrate an apparatus 101 comprising means for obtaining spatial metadata associated with spatial audio content. The spatial audio content may represent immersive audio content or any other suitable type of content. The means may also be configured for obtaining a configuration parameter indicative of a source format of the spatial audio content; and using the configuration parameter to select a method of compression of the spatial metadata associated with the spatial audio content.

The apparatus 101 may be for recording and/or processing captured audio signals.

FIG. 1 schematically illustrates an apparatus 101 according to examples of the disclosure. The apparatus 101 illustrated in FIG. 1 may be a chip or a chip-set. In some examples the apparatus 101 may be provided within devices such as a processing device. In some examples the apparatus 101 may be provided within an audio capture device or an audio rendering device.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 2 and 6 to 9. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: spatial metadata associated with spatial audio content; obtaining 203 a configuration parameter indicative of a source format of the spatial audio content; and using 205 the configuration parameter to select a method of compression of the spatial metadata associated with the spatial audio content.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: obtaining 201 spatial metadata associated with spatial audio content; obtaining 203 a configuration parameter indicative of a source format of the spatial audio content; and using 205 the configuration parameter to select a method of compression of the spatial metadata associated with the spatial audio content.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

FIG. 2 illustrates an example method. The method could be implemented using an apparatus 101 as shown in FIG. 1.

The method comprises, at block 201 obtaining spatial metadata associated with spatial audio content. In some examples the spatial metadata could be obtained with the spatial audio content. In other examples the spatial metadata could be obtained separately to the spatial audio content. For instance, the apparatus 101 could obtain the spatial audio content and the could separately process the spatial audio content to obtain the spatial metadata.

The spatial audio content comprises content which can be rendered so that a user can perceive spatial properties of the audio content. For example, the spatial audio content may be rendered so that the user can perceive the direction of origin and the distance from an audio source. The spatial audio may enable an immersive audio experience to be provided to a user. The immersive audio experience could comprise a virtual reality, augmented reality, mixed reality or extended reality experience or any other suitable experience.

The spatial metadata that is associated with the spatial audio content comprises information relating to the spatial properties of a sound space represented by the spatial audio content. The spatial metadata may comprise information such as the direction of arrival of audio, distances to an audio source, direct-to-total energy ratios, diffuse-to-total energy ratio or any other suitable information. The spatial metadata may be provided in frequency bands.

At block 203 the method comprises obtaining a configuration parameter indicative of a source format of the spatial audio content. The configuration parameter may indicate the format of the spatial audio that has been used to obtain spatial metadata. In some examples the source format may indicate a configuration of the microphones that have been used to capture the spatial audio content that is then used to obtain spatial metadata.

The source format could be any suitable type of format. Examples of different source formats comprise configurations such as three dimensional spatial microphone configurations, two dimensional spatial microphone configurations, mobile phones with four or more microphones configured for three dimensional audio capture, mobile phones with three or more microphones configured for two dimensional audio capture, mobile phone with two microphones, surround sound such as 5.1 mix or 7.1 mix or any other suitable type of source format. The different source formats will produce spatial audio content which has associated spatial metadata. The different spatial metadata associated with the different source formats may have different characteristics.

The configuration parameter could comprise bits of data which indicate the source format. For instance, in some examples the configuration parameter could comprise eight bits of data which enables 256 different combinations for indicating the source format. Other numbers of bits could be used in other examples of the disclosure.

In such examples the bits of data could be configured in a predefined format. For instance, where the configuration parameter comprises eight bits the first two bits could define the overall source type. The overall source type could indicate whether the source is a microphone array, a channel-based source, a mobile device or a mixture. A mixture source could comprise audio captured by a microphone array mixed with a channel based source. For instance, a microphone array could be used to capture spatial audio and then a channel based music track is added as background audio. The channel based track could be provided from an audio file selected via a user interface or by any other suitable control means. It is to be appreciated that other mixture sources could be used in other examples of the disclosure.

The third bit could indicate whether or not the source contains elevation. For example, the third bit could indicate true or false depending on whether or not the source contains elevation.

The remaining five bits could comprise more detailed information about the source format. The more detailed information about the source format could be the type of microphone array which could indicate the number of microphones and the relative positions of the microphones or any other suitable type of format. In some examples the more detailed information about the source format could define a channel configuration such as 5.1, 7.1, 7.1+4, 22.2, 2.0 or any other suitable type of channel configuration. In some examples the more detailed information about the source format could indicate the type of mobile device that has been used to capture the spatial audio. For instance, it could indicate that the device was a specific six microphone mobile device, a generic four microphone device, a generic three microphone device or any other suitable type of device. In some examples the more detailed information about the source type could define a combination of different source types. For instance, it could comprise a 5.1 channel based format and one or more mobile devices or any other type of combination.

It is to be appreciated that other arrangements of the bits could be used in other examples of the disclosure. For instance, in some examples it may be possible to determine whether or not the source contains elevation from the indication of the source format and so in such cases the third bit indicating whether or not the source contains elevation might not be needed. For instance, if the source format is indicated as 5.1 then it would be inherent that this is a source format with no elevation while if the source format is indicated as 7.1+4 then it would be inherent that this is a source format with elevation.

In some examples a list of source formats could be used and the source configuration parameter could be indicative of a source format from the list.

At block 205 the method comprises using the configuration parameter to select a method of compression of the spatial metadata associated with the spatial audio content. For example, a plurality of compression methods may be available and the configuration parameter may be used to select one of these available parameters.

In some examples the configuration parameter may be used to select a codebook to compress the spatial metadata associated with the spatial audio content. The codebook could be any suitable spatial metadata compression codebook that can be used both for encoding and decoding the spatial metadata. The codebook may comprise a look-up table of values that can be used to compress and then reconstruct the spatial metadata. In some examples the codebook could comprise a combination of look-up tables and algorithms and any other suitable methods. In some examples a switching system could be used which could enable switching between different types of codebooks.

In some examples the configuration parameter may be used to select one or more algorithms. The algorithms could then be used to generate a codebook or other method of compression. For instance, in some examples the configuration parameter could enable the selection of an algorithm that enables values to be computed based on a transmitted index value.

Where the configuration parameter enables selection of a codebook, the codebook could be prepared in advanced based on statistics of a set of input samples that represent the category of source format. The correct codebook could then be selected from the prepared codebooks based, at least partly, on the source configuration parameter.

In some examples the configuration parameter could be used to enable a codebook for compressing the spatial metadata to be created. The source configuration parameter could provide some information about the statistics of the parameters and this information could be used to create a new codebook and/or modify an existing codebook.

Information indicative of the codebook that has been selected may be transmitted from an encoding device to a decoding device. The information indicative of the codebook that has been selected could be transmitted as a dynamic value within a metadata stream. In other examples the information indicative of the codebook that has been selected could be transmitted through a separate channel at the start of a transmission or at specific time points during the transmission.

FIG. 3 illustrates an example system 301 that could be used in implementations of the disclosure. The system 301 comprises an encoding device 303 and a decoding device 305. It is to be appreciated that in other examples the system 301 could comprise additional components that are not shown in the system 301 of FIG. 1 for instance the system could comprise one or more intermediary devices such as storage devices.

The encoding device 303 may be any device which is configured to obtain spatial metadata associated with spatial audio content. In some examples the encoding device 303 could be configured to encode the spatial audio content and spatial metadata.

In the example of FIG. 3 the encoding device 303 comprises an analysis processor 105A. The analysis processor 105A is configured to receive an input audio signal 311. The input audio signal may represent captured spatial audio signals. The input audio signal could be received from a microphone array, from multichannel loudspeakers or from any other suitable source. In some examples the input audio signal 311 may comprise Ambisonics signals or variations of Ambisonics signals. In some examples the audio signals may comprises first order Ambisonics (FOA) signals or higher order Ambisonics (HOA) signals or any other suitable type of spherical harmonic signal.

In some examples the analysis processor 105A may be configured to analyse the input audio signal 311 to obtain a spatial audio content and spatial metadata. It is to be appreciated that in other examples the analysis processor 105A could receive both the spatial audio content and the spatial metadata. In such examples it would not be necessary for the analysis processor 105A to analyse the spatial audio content to obtain the spatial metadata.

The analysis processor 105A is configured to create the transport signals 313 for the spatial audio content and spatial metadata. The analysis processor 105A may be configured to encode both the spatial audio content and the spatial metadata to provide the transport signal 313.

In the example system 301 shown in FIG. 3 the transport signal 313 is transmitted to a decoding device 305. In some examples the transport signal 313 could be transmitted to a storage device and then could be retrieved from the storage device by one or more decoding devices. In other examples the transport signal 313 could be stored in a memory of the encoding device 303. The transport signal 313 could then be retrieved from the memory for decoding and rendering at a later point in time.

In the example of FIG. 3 the decoding device 305 comprises a synthesis processor 105B. The synthesis processor 105B is configured to receive the transport signal 313 and synthesize spatial audio output signals 315 based on the received transport signal 313. The synthesis processor 105B decodes the received transport signal in order to synthesize the spatial audio output signals 315.

The synthesis processor 105B uses the spatial metadata to create the spatial properties of the spatial audio content so as to provide to a listener spatial audio content that represents the spatial properties of the captured sound scene. The spatial audio may enable immersive audio to be provided to a user. The spatial audio output signals 315 could be a multichannel loudspeaker signal, a binaural signal, a spherical harmonic signal or any other suitable type of signal.

The spatial audio output signals 315 can be provided to any suitable rendering device such as one or more loudspeakers, a head set or any other suitable rendering device.

FIG. 4 shows features of an example encoding device 303 in more detail. The example encoding device 303 comprises a transport audio signal generator 401, a spatial analyser 403 and a multiplexer 405. In some examples the transport audio signal generator 401, the spatial analyser 403 and the multiplexer 405 could comprise modules within the analysis processor 105A.

The transport audio signal generator 401 receives the input audio signal 311 comprising spatial audio content. The transport audio signal generator 401 is configured to generate the transport audio signal 411 from the received input audio signal 311. The source format of the spatial audio content may be used to generate the transport audio signal. For instance, in order to generate a stereo transport audio signal, if the spatial audio content was captured by a microphone array such as a spherical microphone grid, then two opposite microphones could be selected as the transport signals. Equalization or other suitable processing may be applied to the transport signals.

The transport audio signal 411 could comprise a mono signal, a stereo signal, a binauralized stereo signal, or any other suitable signal, e.g. a FOA signal.

The spatial analyser 403 also receives the input audio signal 311 comprising spatial audio content. The spatial analyser 403 is configured to analyse the spatial audio content to provide spatial parameters which form spatial metadata. The spatial parameters represent the spatial properties of a sound space represented by the spatial audio content. The spatial parameters may comprise information such as the direction of arrival of audio, distances to and audio source, direct-to-total energy ratios, diffuse-to-total energy ratio or any other suitable parameters. The spatial analyser 403 may analyse different frequency bands of the spatial audio content so that the spatial metadata may be provided in frequency bands. For instance a suitable set of frequency bands would be 24 frequency bands that follow the Bark scale. Other sets of frequency bands could be used in other examples of the disclosure.

The spatial analyser 403 provides one or more output signals comprising spatial metadata. In the example shown in FIG. 4 the spatial analyser 403 provides a first output 415 indicating direction parameter and a second output 417 indicating direct to total energy ratios for the different frequency bands. It is to be appreciated that other outputs and parameters could be provided in other examples of the disclosure. These other parameters could be provided instead of, or in addition to, the direction parameter and the energy ratios.

The multiplexer 405 is configured to receive the transport audio signal 411 and the spatial metadata outputs 415, 417 and combine these to generate the transport signal 313.

In the example of FIG. 4 the multiplexer also receives an additional input 419 which comprises the source configuration parameter. The source configuration parameter indicates the source format of the spatial audio content.

In the example of FIG. 4 the source configuration parameter is received separately to the spatial audio content. For instance, information about the source format could be stored in a memory and could be retrieved by the multiplexer. In other examples the information about the source format could be received with the spatial audio content. In some examples the transport audio signal generator 401 and/or the spatial analyser 403 could also use the source configuration parameter.

The multiplexer 405 is configured to encode the spatial audio content and also the spatial metadata. The source configuration parameter is used to select the method of compression of the spatial metadata. For instance, the source configuration parameter may be configured to select a codebook to use to encode the spatial metadata.

In the example of FIG. 4 the multiplexer 405 comprises a transport audio signal encoding module 421 and spatial metadata encoding module 423. The transport audio signal encoding module 421 is configured to encode and/or compress the transport audio signal 411 and the spatial metadata encoding module 423 is configured to encode and/or compress the spatial metadata which may be obtained from the spatial analyser 403. Different methods of encoding and/or compression could be used to encode the audio content and the spatial metadata.

The multiplexer also comprises a datastream generator/combiner module 425. The datastream generator/combiner module 425 is configured to combine the compressed transport audio signal and the compressed spatial metadata into a transport signal 313 which is provided as an output of the encoding device 303.

In the example shown in FIG. 4 the transport audio signal generator 401, a spatial analyser 403 and a multiplexer 405 are all shown as part of the same encoding device 303. It is to be appreciated that other configurations could be used in other examples of the disclosure. In some examples the transport audio signal generator 401 and the spatial analyser 403 could be provided in a separate device or system to the multiplexer 405. For instance, where MASA (metadata-assisted spatial audio) is used the spatial analysis is performed before the content is provided to the encoding device 303. In such examples the encoding device 303 obtains a file or stream comprising the spatial metadata and a transport audio signal 411.

FIG. 5 shows features of an example decoding device 305 in more detail. The example decoding device 305 comprises a demultiplexer 501, a prototype signal generator module 503, a direct stream generator module 505, a diffuse stream generator module 507 and a stream combiner module 509. The demultiplexer 501, prototype signal generator module 503, direct stream generator module 505, diffuse stream generator module 507 and stream combiner module 509 could comprise modules within the synthesis processor 105B.

The demultiplexer 501 receives the transport signal 313 comprising the encoded spatial audio content and the encoded spatial metadata as an input. The transport signal may comprise the configuration parameter. The demultiplexer 501 is configured to receive the transport signal 313 and separate this into two or more separate components. In the example in FIG. 5 the demultiplexer 501 is configured to separate the transport signal 313 into a separate decoded transport audio signal 511 and one or more outputs 513, 515 which comprise the decoded spatial metadata.

In the example of FIG. 5 the demultiplexer 501 comprises a datastream receiver/splitter module 521. The datastream receiver/splitter module 521 is configured to receive the transport signal 313 and split this into at least a first component comprising the spatial audio content and a second component comprising the spatial metadata.

The demultiplexer 501 also comprises a transport audio signal decompressor/decoder module 523. The transport audio signal decompressor/decoder module 523 is configured to receive the component comprising the audio content from the datastream receiver/splitter module 521 and decompress the audio content. The transport audio signal decompressor/decoder module 523 then provides the decoded transport audio signal 511 as an output.

In the example shown in FIG. 5 the demultiplexer 501 also comprises a metadata decompressor/decoder module 525. The metadata decompressor/decoder module 525 is configured to receive the component comprising the metadata from the datastream receiver/splitter module 521. The metadata decompressor/decoder module 525 uses the decompression method indicated by the source configuration parameter to decompress the spatial metadata. This could be a different decompression method to the method used for the spatial audio content. Once the spatial metadata has been decompressed the metadata decompressor/decoder module 525 provides one or more outputs 513, 515 comprising the decoded spatial metadata. In the example shown in FIG. 5 the metadata decompressor/decoder module 525 provides a first output 513 which comprises spatial metadata relating to the directions of the spatial audio content and a second output 515 which comprises spatial metadata relating to the energy ratios of the spatial audio content. It is to be appreciated that other outputs providing data relating to other spatial parameters could be provided in other examples of the disclosure.

In the example of FIG. 5 the decoded transport audio signal 511 is provided to a prototype signal generator module 531. The prototype signal generator module 531 is configured to create a suitable prototype signal 541 for the output device that is being used to render the spatial audio content. For example, if the output device comprises a loudspeaker setup in a 5.1 configuration and the transport audio signal 511 is a stereo signal then the left channels would receive the left signal, the right channels would receive the right signal, and the center channel would receive a mixture of left and right signals. It is to be appreciated that other types of output device could be used in other examples of the disclosure. For instance, the output device could be a different arrangement of loudspeakers or could be a head set or could be any other suitable type of output device.

The prototype signal 541 from the prototype signal generator module 531 is provided to both the direct stream generator module 505 and the diffuse stream generator module 507. In the example shown in FIG. 5 the direct stream generator module 505 and diffuse stream generator module 507 also receive the outputs 513, 515 comprising the spatial metadata. In other embodiments that may be different and/or additional types of spatial metadata used. In some examples different spatial metadata could be provided to the direct stream generator module 505 and diffuse stream generator module 507.

In the example shown in FIG. 5 the direct stream generator module 505 and diffuse stream generator module 507 use the spatial metadata to create a direct stream 543 and a diffuse stream respectively 545. For example the spatial metadata relating to the direction parameters may be used to create the direct stream 543 by panning the sound to the direction indicated by the metadata. The diffuse stream 545 may be created from a decorrelated signal of all, or substantially all, of the available channels.

The diffuse stream 545 and the direct stream 543 are provided to the stream combiner module 509. The stream combiner module 509 is configured to combine the direct stream 543 and the diffuse stream 545 to provide spatial audio output signals 315. The spatial metadata relating to the energy ratios may be used to combine the direct stream 543 and the diffuse stream 545.

The spatial audio output signals 315 could be provided to a rendering device such as one or more loudspeakers, a headset or any other suitable device which is configured to convert the electronic spatial audio output signals 315 into audible signals.

In the example shown in FIG. 5 the demultiplexer 501, the prototype signal generator module 503, the direct stream generator module 505, the diffuse stream generator module 507 and the stream combiner module 509 are all shown as part of the same decoding device 305. It is to be appreciated that other configurations could be used in other examples of the disclosure. For instance, in some examples the output of the demultiplexer 501 could be stored as a file in a memory. This could then be provided to a separate device or system for processing to obtain the spatial audio output signals 315.

FIG. 6 illustrates a method that could be used to create a codebook for compression of the spatial metadata in some examples of the disclosure. The method shown in FIG. 6 could be performed by an encoding device 303 such as the encoding device 303 shown in FIG. 4 or any other suitable device.

At block 601 a source configuration is selected. The source configuration is the format that is used for capturing audio signals. The selecting of the source configuration could comprise selecting the microphone arrangement that is to be used to capture the audio signals, selecting the devices that are to be used to capture the audio signals, selecting the pre-mixed channel format, or any other selections.

At block 603 spatial audio content is obtained. The spatial audio content that is obtained is captured using the source configuration that is selected at block 601. The spatial audio content could comprise a representative set of audio samples. The representative set of samples could comprise a standard set of acoustic signals that can be used for the purposes of creating a codebook for compression of the spatial metadata. The representative set of samples could comprise one or more acoustic samples with different spatial properties.

At block 605 spatial analysis is performed on the obtained spatial audio content. The spatial analysis determines one or more spatial parameters of the spatial audio content. The spatial parameters could be direction parameters, energy ratio parameters, coherence parameters or any other suitable parameters. The spatial analysis that is performed could be the same spatial analysis process that is performed by the spatial analyser 403 of the encoding device 303 to obtain spatial metadata. Where the obtained spatial audio content comprises a representative set of samples the same spatial analysis may be performed on each of the samples within the set.

At block 607 the statistics of the spatial parameters obtained at block 605 are analyzed. The analysis enables the probability of occurance for each parameter value to be determined. The analysis could comprise counting each occurrence of a parameter value from the obtained spatial audio. The occurrences could be counted using a histogram or any other suitable means.

At block 609 the method comprises using the statistics obtained at block 607 to design a codebook. For instance, the codebook could be designed so that the most probable parameters have the shortest code values while the least probable parameters are assigned longer code values. This may be achieved by ordering the parameter values from the highest occurrence to the lowest occurrence and then assigning code values to the ordered parameter values starting with the parameter value with the highest occurrence which is assigned the shortest available code value. This ensures that the spatial metadata will use fewer bits per value after it has been compressed. The codebook that this creates could comprise look-up tables, or any other suitable information. In some examples one or more algorithms could be used to generate the codebook.

At block 611 the codebook is stored. The codebook could be stored in a memory of the encoding device 303 or in any other suitable storage location. The codebook is stored so that it can be accessed during compression and decompression of the spatial metadata.

The method of FIG. 6 shows an example of creating a codebook. In other examples an existing codebook could be modified by applying known restrictions to them. For instance, a codebook for a three dimensional microphone may be available but the source format could be a two dimensional microphone array. In such examples the codebook for the three dimensional array could be modified so that all horizontal direction parameter values receive the shorter code values in the codebook. As another example a codebook could be available for a 5.1 loudspeaker input but the source format could be a 2.0 loudspeaker input. In such examples the codebook for the 5.1 loudspeaker input could be modified so that direction parameter values between −30° and 30° receive the shorter code values.

FIG. 6 shows an example method of creating a codebook. This method could be carried out by a vendor such as a mobile device manufacturer as part of the product specification. Once the codebook has been created it can be used to encode and decode spatial metadata. The codebook can be used by devices such as immersive audio capture devices. A configuration parameter may be associated with the codebook so that the correct codebook can be selected for the coding and decoding of the spatial metadata.

FIG. 7 illustrates an example method of encoding spatial audio and spatial metadata. The example method shown in FIG. 7 could be performed by a multiplexer 405 of an encoding device 303 as shown in FIG. 4 or any other suitable device. In the example shown in FIG. 7 the input signals are provided in a parametric spatial audio format with separate spatial audio content and spatial metadata and the source configuration parameter is provided as part of that format.

At block 701 the multiplexer 405 obtains audio content. The audio content may be obtained in transport audio signals 411. The transport audio signal 411 could be obtained from a transport audio signal generator 401 as shown in FIG. 4. The audio content has been captured using a source format. The source format may have been preselected before the audio content is captured or may be defined by the devices that are used to capture the spatial audio.

At block 703 the multiplexer 405 obtains spatial metadata. The spatial metadata may comprise outputs 415, 417 from a spatial analyser 403. The spatial metadata may be provided in a parametric format which comprises values for one or more spatial parameters of the spatial audio content that is provided within the transport signal 411. The spatial metadata could be obtained from a spatial analyser 403 as shown in FIG. 4.

At block 705 the multiplexer 405 obtains a source configuration parameter. The input source configuration parameter indicates the source format that was used to capture the spatial audio or an equivalent description of the source configuration. The source configuration parameter could be received as an input from the capturing device or could be received in response to a user input via a user interface or by any other suitable means. The source configuration parameter could be obtained as part of the spatial metadata package. In such examples obtaining the source configuration parameter could comprise reading the parameter from the spatial metadata package.

At block 707 the spatial audio content is compressed. The spatial audio content may be compressed using any suitable technique. In the example shown in FIG. 7 the source configuration parameter is not used to compress the audio transport signals 411 comprising the spatial audio content. The audio transport signals 411 could be compressed using any suitable process such as AAC (advanced audio coding), EVS (enhanced voice services) or any other suitable process.

At block 709 the method of compression for the spatial metadata is selected. The obtained source configuration parameter is used to select the method of compression of the spatial metadata. Selecting the method of compression could comprise selecting a pre-formed codebook which corresponds to the source format for the captured spatial audio. The pre-formed codebook could be stored in a memory of the encoding device 303 or in any memory which is accessible by the encoding device 303. In some examples selecting the method of compression could comprise selecting a computable or algebraic codebook, where the codebook is based on an algorithm.

Once the pre-formed codebook has been retrieved from the memory it may be passed to a spatial metadata encoding module 423 so that at block 711 the codebook can be used to compress the spatial metadata. The method of compressing the spatial metadata could be any method of compression which uses the codebook. For instance, the method could comprise Huffman coding or any other suitable process.

In some examples before the spatial metadata is compressed a quantization process may be performed. The quantization process may comprise quantizing the parameter values of the parametric spatial metadata so that each parameter value has a corresponding code value. In some examples the source configuration parameter could also be used for the quantization process as the optimal quantization may also depend on the source format. For instance a spherically uniform quantization could be applied to a direction parameter when there is elevation in the source format so as to obtain a more uniform, and perceptually better, quantized direction distribution than would be achieved with other quantization processes.

In some examples the source configuration parameter can be used to determine the quantization process that is used. In such cases it might not be necessary to provide a separate indication of the source configuration parameter to a decoder device 305 as the correct source configuration and/or method compression could be inherent from the quantization process.

At block 713 the compressed spatial audio content and the compressed spatial metadata are encoded together to form an encoded transport signal 313. The combining of the compressed spatial audio content and the compressed spatial metadata could be performed by a datastream generator/combiner module 425 or any other suitable module. In some examples the combining of the compressed spatial audio content and the compressed spatial metadata could also comprise further compression such as run-length encoding or any other lossless encoding.

FIG. 8 illustrates another example method of encoding spatial audio and spatial metadata. The example method shown in FIG. 8 could be performed by an encoding device 303 of an audio capturing device or any other suitable device. In the example shown in FIG. 8 the input signals are not provided to the encoding device 303 in a parametric spatial audio format as shown in FIG. 7. Instead, in the example of FIG. 8 the spatial audio is analysed within the encoding device 303 to determine the spatial metadata.

At block 801 spatial audio is captured. The spatial audio is captured using a source format.

At block 805 the captured spatial audio is processed to form an audio transport signal 411. The audio transport signal 411 comprises the audio content. The processing of the captured spatial audio to form an audio transport signal 411 may be performed by a transport audio signal generator 401 or any other suitable component.

At block 807 spatial analysis is performed on the spatial audio content to obtain the spatial metadata. The spatial analysis could be performed by a spatial analyser 403 as shown in FIG. 4 or by any other suitable component. The spatial metadata may be provided in a parametric format. That is, the spatial metadata may comprise one or more spatial parameters and may comprise values for one or more spatial parameters of the spatial audio.

At block 803 a source configuration parameter is obtained. The input source configuration parameter indicates the source format that was used to capture the spatial audio. The source configuration parameter could be stored in the memory of the audio capturing device or could be received in response to a user input via a user interface or by any other suitable means.

At block 809 the audio transport signals 411 comprising the spatial audio content are compressed. The audio transport signals 411 may be compressed using any suitable technique. In the example shown in FIG. 8 the source configuration parameter is not used to compress the audio transport signals 411 comprising the spatial audio content. The audio transport signals 411 could be compressed using any suitable process such as AAC (advanced audio coding), EVS (enhanced voice services) or any other suitable process.

At block 811 the method of compression for the spatial metadata is selected. The obtained source configuration parameter is used to select the method of compression of the spatial metadata. As shown in the method of FIG. 7 selecting the method of compression could comprise selecting a pre-formed codebook which corresponds to the source format for the captured spatial audio. The pre-formed codebook could be stored in a memory of the encoding device 303 or in any memory which is accessible by the encoding device 303.

Once the pre-formed codebook has been retrieved from the memory it may be passed to a spatial metadata encoding module 423 so that at block 813 the codebook can be used to compress the spatial metadata. The method of compressing the spatial metadata could be any method of compression which uses the codebook. For instance the method could comprise Huffman coding or any other suitable process. A quantization process may be applied to the spatial metadata before the spatial metadata is compressed.

At block 815 the compressed spatial audio content and the compressed spatial metadata are encoded together to form an encoded transport signal 313. The combining of the compressed spatial audio content and the compressed spatial metadata could be performed by a datastream generator/combiner module 425 or any other suitable module. In some examples the combining of the compressed spatial audio content and the compressed spatial metadata could also comprise further compression such as run-length encoding or any other lossless encoding.

FIG. 9 illustrates an example decoding method. The example method shown in FIG. 9 could be performed by decoding device 305 as shown in FIG. 5 or any other suitable device.

At block 901 the received encoded transport signal 313 is decoded into a separate transport audio stream and spatial metadata stream. The transport audio stream comprises the audio content and the spatial metadata stream comprises parametric values relating to the spatial properties of the transport audio stream.

At block 903 the spatial audio content from the transport audio stream is decompressed. Any suitable process may be used for the decompression of the spatial audio content. At block 905 a prototype signal 541 is formed. The prototype signal 541 may be formed by a prototype signal generator module 531 as shown in FIG. 5 or any other suitable component.

At block 907 the source configuration parameter is obtained. In some examples the source configuration parameter could be received with the encoded transport signal 313. For instance the source configuration parameter could be encoded into the spatial metadata stream. In such examples the source configuration parameter could be provided as the first value in the spatial metadata stream or any other defined value in the spatial metadata stream. Providing the source configuration parameter with the spatial metadata stream could allow for updating of the source configuration for different signal frames which can help to increase the efficiency of the compression.

In other examples the source configuration parameter could be received separately to the encoded transport signal 313. This could be provided through a separate signaling channel to the spatial metadata or the spatial audio content. For instance the source configuration parameter could be provided separately to the bitstream that transmits the audio content and the spatial metadata.

At block 909 the source configuration parameter is used to select a method of decompression for the spatial metadata. Selecting the method of decompression could comprise selecting a codebook based on the source configuration parameter.

At block 911 the selected method of decompression is used to decompress the spatial metadata and provide spatial metadata parameters to the synthesizer. The decompression of the spatial metadata may be an inverse of the process which has been used to compress the spatial metadata. For example, decompressing the spatial metadata may comprise reading code values from the spatial metadata stream and retrieving a corresponding parameter value from the selected codebook. In other examples the code vales from the spatial metadata stream could be used in an algorithm that provides the corresponding parameter value via computational means. In some examples the algorithms could be used instead of a look-up table. In other examples the algorithms could be used in addition to the look-up tables.

At block 913 the spatial metadata and the prototype signal 541 are synthesized into spatial audio output signals.

In the example method shown in FIG. 9 the source configuration parameter is provided to the decoding device 305. In other examples a codebook could be passed between the encoding device 303 and the decoding device 305 where the codebook has been selected by the encoding device 303 on the basis of the source configuration parameter.

Examples of the disclosure therefore provide apparatus and methods and computer programs for efficiently encoding spatial metadata by enabling an appropriate compression method to be used for the spatial metadata. This can be done as a separate process to the encoding of the audio content.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term “comprise” is used in this document with an inclusive not an exclusive meaning. That is any reference to X comprising Y indicates that X may comprise only one Y or may comprise more than one Y. If it is intended to use “comprise” with an exclusive meaning then it will be made clear in the context by referring to “comprising only one . . . ” or by using “consisting”.

In this description, reference has been made to various examples. The description of features or functions in relation to an example indicates that those features or functions are present in that example. The use of the term “example” or “for example” or “can” or “may” in the text denotes, whether explicitly stated or not, that such features or functions are present in at least the described example, whether described as an example or not, and that they can be, but are not necessarily, present in some of or all other examples. Thus “example”, “for example”, “can” or “may” refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Explicitly indicate that features from different embodiments (e.g. different methods with different flow charts) can be combined, to Although functions have been described with reference to certain features, those functions may be performable by other features whether described or not.

Although features have been described with reference to certain embodiments, those features may also be present in other embodiments whether described or not.

The term “a” or “the” is used in this document with an inclusive not an exclusive meaning. That is any reference to X comprising a/the Y indicates that X may comprise only one Y or may comprise more than one Y unless the context clearly indicates the contrary. If it is intended to use “a” or “the” with an exclusive meaning then it will be made clear in the context. In some circumstances the use of “at least one” or “one or more” may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising processing circuitry; and memory circuitry including computer program code, the memory circuitry and the computer program code configured to, with the processing circuitry, cause the apparatus to:

obtain spatial metadata associated with spatial audio content;

obtain a configuration parameter comprising, at least, an indication of an input source format of the spatial audio content;

use, at least, the configuration parameter to select a method of compression of, at least in part, the spatial metadata associated with the spatial audio content; and provide the selected method of compression for processing.

2. An apparatus as claimed in claim 1, wherein using the configuration parameter to select the method of compression comprises causing the apparatus to use the configuration parameter to select a codebook to compress the spatial metadata associated with the spatial audio content.

3. An apparatus as claimed in claim 1, wherein using the configuration parameter to select the method of compression comprises causing the apparatus to use the configuration parameter to enable a codebook for compressing the spatial metadata, to be created, wherein the selected method of compression comprises, at least, the codebook.

4. An apparatus as claimed in claim 2, wherein providing the selected method of compression for processing comprises causing the apparatus to use the selected codebook to encode the spatial metadata.

5. An apparatus as claimed in claim 1, wherein the indication of the input source format comprises an indication of at least one of:

at least one configuration of microphones used to capture the spatial audio content, at least one configuration of channels used to represent the spatial audio content, at least one type of device used to capture the spatial audio content, or whether a source of the spatial audio content contains elevation.

6. An apparatus as claimed in claim 1, wherein the spatial metadata comprises data indicative of spatial parameters of the spatial audio content.

7. An apparatus as claimed in claim 1, wherein the apparatus is configured to select the method of compression independently of the spatial audio content, wherein the selected method of compression comprises a method of compression defined based, at least partially, on at least one characteristic of the input source format of the spatial audio content.

8. An apparatus as claimed in claim 1, wherein the apparatus is configured to cause obtaining of the spatial audio content.

9. An apparatus as claimed in claim 8, wherein the apparatus is configured to obtain the configuration parameter with the spatial audio content.

10. An apparatus as claimed in claim 8, wherein the apparatus is configured to obtain the configuration parameter separately from the spatial audio content.

11. An apparatus as claimed in claim 1, wherein the apparatus is configured to cause transmitting of a compressed version of the spatial metadata to a decoding device.

12. A method comprising:

obtaining spatial metadata associated with spatial audio content;

obtaining a configuration parameter comprising, at least, an indication of an input source format of the spatial audio content;

using, at least, the configuration parameter to select a method of compression of, at least in part, the spatial metadata associated with the spatial audio content; and providing the selected method of compression for processing.

13. A method as claimed in claim 12, wherein the using of the configuration parameter to select the method of compression comprises using the configuration parameter to select a codebook to compress the spatial metadata associated with the spatial audio content.

14. An apparatus comprising processing circuitry; and memory circuitry including computer program code, the memory circuitry and the computer program code configured to, with the processing circuitry, cause the apparatus to:

receive, from an encoding device, spatial audio content;

receive, from the encoding device, compressed spatial metadata associated with the spatial audio content;

receive, from the encoding device, information indicative of a method used to compress, at least in part, spatial metadata associated with the spatial audio content, wherein the information indicative of the method comprises information indicative of a method selected based on a configuration parameter comprising, at least, an indication of an input source format of the spatial audio content; and provide the information indicative of the method for processing.

15. An apparatus as claimed in claim 14, wherein the information indicative of the method used to compress the spatial metadata comprises the configuration parameter.

16. An apparatus as claimed in claim 14, wherein the information indicative of the method used to compress the spatial metadata comprises an indication of a codebook that was selected using the configuration parameter.

17. An apparatus as claimed in claim 14, further comprising one or more transceivers, wherein receiving the spatial audio content comprises causing the apparatus to:

receive, with the one or more transceivers from the encoding device, the spatial audio content, wherein receiving the compressed spatial metadata comprises causing the apparatus to:

receive, with the one or more transceivers from the encoding device, the compressed spatial metadata.

18. A method comprising:

receiving, from an encoding device, spatial audio content;

receiving, from the encoding device, compressed spatial metadata associated with the spatial audio content;

receiving, from the encoding device, information indicative of a method used to compress, at least in part, spatial metadata associated with the spatial audio content, wherein the information indicative of the method comprises information indicative of a method selected based on a configuration parameter comprising, at least, an indication of an input source format of the spatial audio content; and providing the information indicative of the method for processing.

19. A method as claimed in claim 18, wherein the information indicative of the method used to compress the spatial metadata comprises the configuration parameter.

20. A method as claimed in claim 18, wherein the information indicative of the method used to compress the spatial metadata comprises an indication of a codebook that was selected using the configuration parameter.

* * * * *